United States Patent [19]

Jenkins

[11] Patent Number: 4,784,459
[45] Date of Patent: Nov. 15, 1988

[54] JOINING OF OPTICAL FIBRE CABLES
[75] Inventor: Peter D. Jenkins, Ipswich, England
[73] Assignee: British Telecommunications, London, England
[21] Appl. No.: 709,974
[22] Filed: Mar. 8, 1985

Related U.S. Application Data

[63] Continuation of Ser. No. 387,816, Jun. 14, 1982, abandoned.

[30] Foreign Application Priority Data

Jun. 17, 1981 [GB] United Kingdom ............. 8118564

[51] Int. Cl.⁴ .............................................. G02B 6/38
[52] U.S. Cl. ............................... 350/96.21; 350/96.20; 350/96.22
[58] Field of Search ............... 350/96.20, 96.21, 96.22, 350/96.23

[56] References Cited

U.S. PATENT DOCUMENTS

| 4,148,559 | 4/1979 | Gauthier ..................... | 350/96.20 |
| 4,184,739 | 1/1980 | d'Auria et al. ............... | 350/96.20 |
| 4,252,405 | 2/1981 | Oldham ...................... | 350/96.23 |
| 4,373,777 | 2/1983 | Borsuk et al. ................ | 350/96.23 |

FOREIGN PATENT DOCUMENTS 0066829 12/1982 European Pat. Off. .
2505027 4/1976 Fed. Rep. of Germany .
2518319 7/1976 Fed. Rep. of Germany .
2026200 1/1980 United Kingdom .
2030723 4/1980 United Kingdom .

OTHER PUBLICATIONS

Patents Abstracts of Japan, vol. 5, No. 60 (P-58) 732, 23rd/4/81, p. 75 P 58 & JP-A-56 12607 (Nippon Denshin Denwa Kosha) 07-02-1981-FIGS. 4-7.
IEEE Transactions on Communications, vol. COM-26, No. 7, 7/78, pp. 1068-1076, IEEE, New York, U.S.-A.-D. C. Hanson et al., Integrated Transducer Modules, Connectors & Cables for Industrial Fiber Optic Data Links-p. 1069, r-hand col., L.53-p. 1070, 1-hand Col., L.7-FIG. 4.
Patents Abstracts of Japan, vol. 3, No. 26 (E-95), 6th/3/79, p. 39 E 95 & JP-A-54 4151 (Nippon Denki KK) 12-01-1979.

Primary Examiner—William L. Sikes
Assistant Examiner—Robert E. Wise
Attorney, Agent, or Firm—Solon B. Kemon

[57] ABSTRACT

A submarine cable joint 1 comprises an elongate coupling element 8 each end of which is connected to the annular tensile layer 28 of cables 2, 3 to be joined. Fibre tails 4, 5 from the cables are led out of the coupling element and wound round bobbin 20 for splicing.

1 Claim, 1 Drawing Sheet

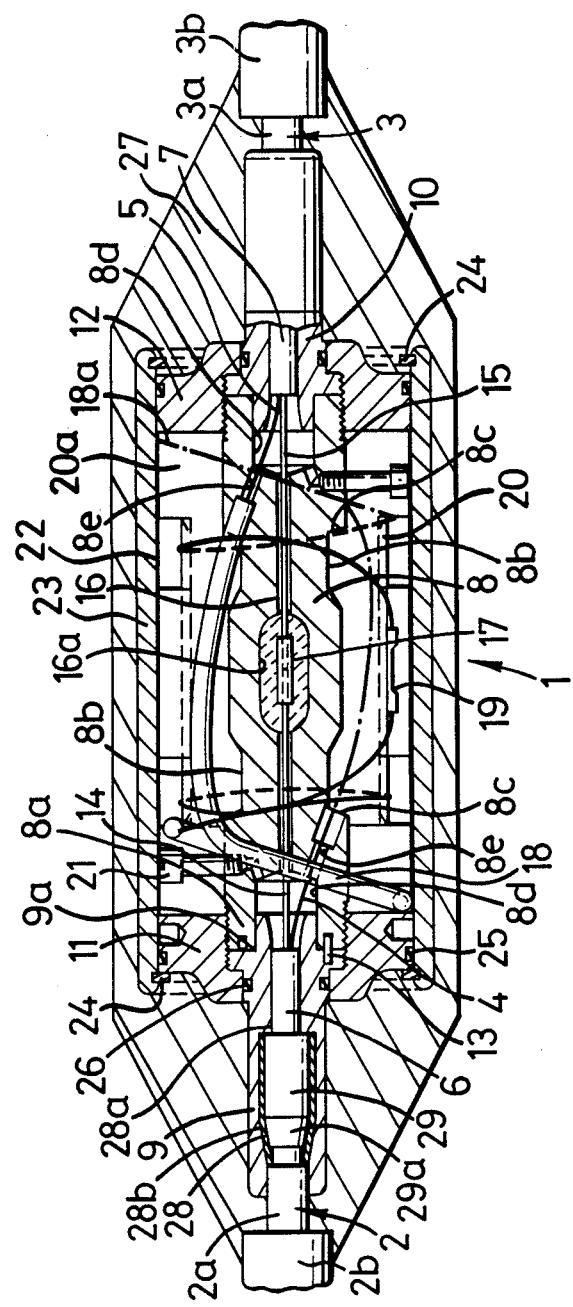

JOINING OF OPTICAL FIBRE CABLES

This application is a continuation of application Ser. No. 387,816, filed June 14, 1982, now abandoned.

DESCRIPTION

This invention relates to the joining of cables based on optical fibres. The cable with which the invention is primarily concerned is intended for submarine use and has one or more optical fibres surrounded by a substantially annular layer resistant to tensile stresses. This annular layer, hereinafter referred to as an annular tensile layer, may be continuous but is conveniently formed of wire strands.

Usually other annular layers are included, specifically an electrically conductive tube between the fibres and the annular tensile layer and an outer protective layer.

A joint between two such cables can be established by securing the respective annular tensile layers to be joined to opposed positions on a coupling element and splicing together the or each meeting pair of fibre ends. It is an objective of the present invention to provide an improved jointing method and jointing assembly.

In accordance with the present invention there is provided a method of joining two cables, each including an annular tensile layer surrounding at least one optical fibre, such method comprising the steps of connecting the annular tensile layers to opposed positions on a coupling member and leading a length of each fibre to be joined to a position outside the coupling member. After the tensile layers are fixed to the coupling member the fibre lengths, hereinafter referred to as fibre tails, are joined together and thereafter a housing fitted around the joined fibres and the coupling member.

The characteristic feature of the present invention is that the fibre tails are not joined within the coupling member but outside thereof at an accessible location. The delicate operation of joining the fibres can moreover be carried out when the load carrying connection is substantially established by joining the tensile layers to the coupling member.

It follows therefore that the coupling member must be such as to allow the fibre tails emerging from the cables within it to be led, radially with respect to the cable, outwardly to the position at which they are joined. According to another aspect of the invention there is provided a joint for cables, particularly submarine cables, comprising an annular tensile layer enclosing at least one optical fibre, such joint comprising a coupling member connectable at opposed locations to the annular layers of two cables to be joined, said coupling element being so constructed as to allow the fibre tails to emerge to an accessible joining position outside the coupling member and an external cover for the coupling and the joined fibre tails.

It is important whilst establishing the connection and after the connection has been made that the optical fibres should not be subject to excessive bending. A typical minimum bend radius is 30 mm. The means on the coupling element which allow emergence of the fibres should ensure that this emergence does not involve excessive fibre bending and, moreover, means are preferably provided for storing joined fibres within the external cover at a greater than a predetermined minimum bend radius. Such means can conveniently comprise a bobbin around which the fibre tails can be wound and ducts for guiding the fibre tails to the bobbin. As the formation of fibre joins in accordance with the invention is based on the use of elongated fibre tails some means of storing the resultant residual lengths after the joins have been made is important.

The invention will now be described by way of example and with reference to the accompanying drawing which is a longitudinal view, mainly sectioned through an optical fibre cable joint for submarine use and constructed in accordance with a particular embodiment of the invention.

The joint 1 illustrated is formed between two optical fibre cables 2 and 3. Each cable 2, 3 comprises a plurality of optical fibres 4, 5, one only of which is illustrated for clarity. The fibre(s) are surrounded by an electrically conductive tube 6, 7 of aluminium or other suitable metal. The tube 6, 7 is surrounded by axially extending high tensile steel wires 28 constituting the annular tensile layer. One or more protective outer layers are provided over the annular tensile layer. In the embodiment being described a copper tube 2a, 3a surrounds the annular tensile layer and serves as a hermetic seal and to assist electric conduction. A polyethylene outer layer 2b, 3b is also provided. The cable further comprises an axially extending central steel wire 14, 15, termed a king wire which absorbs some tensile stresses and serves as a former for surrounding fibres. A waterproofing layer (not shown) may line the conductive tube 6, 7. A rigid and strong steel support sleeve 29 with a frustoconical outer end part 29a is positioned between the annular tensile layer 28 and the conductive tube 6, 7 and a ferrule 9, 10 is swaged onto the support sleeve 29 thereby clamping the steel strands 28 constituting the annular tensile layer. In order to fix the ferrule 28 to each cable 2, 3 the following procedure is adopted. A cable end is prepared for jointing with an exposed fibre tail of sufficient length and the aluminium conductive tube 6, 7 projecting from the steel strands 28 constituting the annular tensile layer. The tapered end 29a of the support sleeve 29 is slid over the conductive tube 6, 7 and pushed under the strands 28 for a short distance. The ferrule 29 is then slid over the cable the narrower bore 28a of the ferrule fitting over the tube 6 and the wider swageable bore 28b receiving the support sleeve 29. Although this is not illustrated a threaded connection can, with advantage, be established between the support sleeve 29 and ferrule 9. Silicon carbide grit is then applied to the annular tensile layer of wires 28 at the junction with the ferrule 9 and the support sleeve 29 (with the ferrule) driven under the wires. The swageable part of the ferrule 9 is then swaged over the support sleeve 29, which has sufficient strength and rigidity to resist crushing, to clamp the wires and a connection, enhanced by the grit, resistant to axial stress developed.

The inner end part of each ferrule 9 has an annular peripheral rebate 9a in which seats the annular outer end part or rim 8a of an elongate centrally i.e. axially disposed coupling member 8. The coupling member 8, formed of electrically conductive metal, is generally dumb-bell shaped with waisted regions 8b defining inwardly directed inclined annular surfaces 8c adjacent each end. An axially extending passage 16 for the king wires 14, 15 extends through the coupling member between chambers 8d defined by the rims 8a. The passage 16 has an enlarged region 16a defined by a slot passing through the coupling member 8. King wire ends can be joined for example by a ferrule 17 crimped on through the slot. The finished joint 17 may be encapsulated in an insulating material, for example resin, to mechanically lock the joint in position and provide a test wire facility for fault location. Bores 8e for emerging fibres connect surfaces 8c and chambers 8d. It will be seen that these bores 8e lead the fibres 4, 5 of the respective cables 2, 3 out and away from the central axial region of the coupling with only slight and non-detrimental bending. Dowels 13 enter registering holes on the end surfaces of the rim 8a of coupling member 8 and the ferrule 9 and prevent relative rotation. An internally threaded bulk head member 11, 12 prefitted to the cable, threadably engages adjacent peripheral portions of the ferrule 9 and coupling member 8 thereby firmly to connect the ferrule to the coupling. The electrically conductive path (left to right) through the joint 1 passes from the composite electrical conductor made up of tube 6 and strands 28 to the ferrule 9 through the swaged connection, and from the ferrule 9 to and through the coupling member 8 through the ferrule 10 and, in like manner, through the swaged connection to cable 3. The face to face connection between the ferrules 9 and 10 and the connector 8 are subjected to tensile loads and the bulk heads 11, 12 are therefore screwed up very tightly using torque forces of the order of 250 lb/ft giving 10 tons thrust on the face to face connection. The end parts of ferrules 9, 10 are closed over copper tubes 2a and 3a.

Once the mechanical and the electrical connection between the cables has been completed as described above the joining or splicing of the individual associated optical fibres 4, 5 may be effected. Prior to joining, tail portions of the fibres, exposed apart from a plastics sheath, adjacent the cable ends are inserted in preformed ducts of nylon or similar material to ensure that the fibres are not bent to excess. A suitable shape of duct is illustrated at 18 and also in chain line at 18a. After the fibre tails have been joined as shown at 19 the excess fibre is stored on a nylon bobbin 20. The bobbin 20 extends between annular flanges 20a removably secured to the end parts of coupling member 8 by screws 21. Axially outwardly of the flanges 20a bulk heads 11, 12 provide end walls of the joint housing coupling member 8. The fibre stored on bobbin 20 is necessarily at greater than the minimum bend radius. The bobbin is also provided with slots to positively locate the splices 19 between the optical fibres in order that they may be readily inspected prior to final completion of the joint. The bobbin flange retaining screws 21 also serve as nipples for the injection of a water blocking agent into the passage 16 and cable ends.

A PTFE protective cover 22 is disposed around the central region of the bobbin 20 to provide a heat shield and prevent the fibres being disturbed when a pressure resisting sleeve 23 providing a peripheral wall of the joint housing is slid over the assembly. The sleeve 23 is secured in position with circlips 24 at either end. The sleeve 23 together with bulk heads 11, 12 and ferrules 9, 10 constitutes a housing for the connected optical fibres. 'O' ring seals 25 and 26 on the flanges and ferrules respectively are provided to prevent entry of water into or through the housing from damaged cable. The sleeve 23 is preferably steel and has a polished surface and radiused ends to eliminate high potential stress in a surrounding polyethylene insulant 27 when a high voltage supply ($>6$ kb) is required on long haul systems.

The sleeve 23 is provided with a polyethylene precoating so that the high surface finish on the sleeve is protected during storage and handling and also to eliminate the need for high temperatures in the central region around the optical fibres during final encapsulation and insulant reinstatement with polyethylene 27 which is applied to the joint assembly using standard injection equipment and techniques.

Some dehydrating material such as silica gel or a molecular sieve may be incorporated into the housing to absorb any water developed in the housing on installation under the sea. The bending limits defined earlier are for dry conditions. If the copper tubes 2a, 3a are omitted some water blocking material should be injected into the cable over the steel strands, this material penetrating into the ferrule.

It will be appreciated that the above described joint constructed for submarine use, has considerable strength, is readily assembled and overcomes the problems of storing excess fibre at an acceptable bend radius.

I claim:

1. A method of joining two cables each including an annular tensile layer surrounding at least one optical fibre such method being characterised by first establishing a mechanical connection between the annular tensile layers with a longitudinally extending coupling member with tubular end parts and leading the ends of said fibres outwardly through bores in the side walls of said end parts, and thereafter joining said ends of said fibres outside of said coupling member and then enclosing the thus formed joint.

* * * * *